United States Patent
Varghese et al.

(10) Patent No.: US 9,816,329 B2
(45) Date of Patent: Nov. 14, 2017

(54) QUICK CONNECTION ARRANGEMENTS WITH LOCKING MECHANISMS

(71) Applicant: Baker Hughes Incorporated, Houston, TX (US)

(72) Inventors: Sibu Varghese, Houston, TX (US); Matthew Krueger, Houston, TX (US)

(73) Assignee: BAKER HUGES, A GE COMPANY, LLC, Houston, TX (US)

( * ) Notice: Subject to any disclaimer, the term of this patent is extended or adjusted under 35 U.S.C. 154(b) by 131 days.

(21) Appl. No.: 14/458,113

(22) Filed: Aug. 12, 2014

(65) Prior Publication Data
US 2016/0047502 A1  Feb. 18, 2016

(51) Int. Cl.
| | |
|---|---|
| *E21B 17/043* | (2006.01) |
| *E21B 17/046* | (2006.01) |
| *F16L 15/08* | (2006.01) |
| *F16L 21/08* | (2006.01) |
| *F16L 37/113* | (2006.01) |
| *E21B 17/08* | (2006.01) |
| *E21B 7/20* | (2006.01) |

(52) U.S. Cl.
CPC .......... *E21B 17/043* (2013.01); *E21B 17/046* (2013.01); *E21B 17/08* (2013.01); *F16L 15/08* (2013.01); *F16L 21/08* (2013.01); *F16L 37/113* (2013.01); *E21B 7/20* (2013.01); *Y10T 29/49881* (2015.01)

(58) Field of Classification Search
CPC ..... F16L 37/0847; F16L 37/10; F16L 37/113; F16L 37/107; F16L 37/0982; F16L 37/105; F16L 21/08; F16L 21/035; F16L 15/08; F16L 15/04; F16L 119/005; F16L 119/02; F16L 119/07; F16L 27/1017; F16L 27/1136; E21B 17/043; E21B 17/046; E21B 17/08; E21B 7/20; Y10T 29/49881

USPC ................ 285/322, 399, 386, 404, 913, 330
See application file for complete search history.

(56) References Cited

U.S. PATENT DOCUMENTS

| | | | |
|---|---|---|---|
| 2,881,842 A | 4/1959 | Wilson | |
| 3,409,319 A | 11/1968 | Van Heeke | |
| 3,623,753 A * | 11/1971 | Henry | ................... E21B 17/046 285/913 X |
| 3,948,321 A | 4/1976 | Owen et al. | |
| 4,379,561 A | 4/1983 | Nelson | |
| 4,407,526 A | 10/1983 | Cicenas | |
| 4,531,766 A | 7/1985 | Crase | |
| 4,570,707 A | 2/1986 | Setterberg, Jr. | |
| 4,573,529 A | 3/1986 | Reinhardt | |
| 4,726,425 A * | 2/1988 | Smith, Jr. | ............... E21B 17/06 166/208 |
| 4,993,755 A | 2/1991 | Johnston | |
| 5,026,200 A * | 6/1991 | van Bilderbeek | .... E21B 17/046 285/321 |
| 5,083,819 A | 1/1992 | Bynum | |

(Continued)

OTHER PUBLICATIONS

Peak Well Systems, "FloSafe Lock Mandrel" Product Catalog (2013), one page.

*Primary Examiner* — Gregory J Binda
*Assistant Examiner* — Zachary T Dragicevich
(74) *Attorney, Agent, or Firm* — Shawn Hunter

(57) ABSTRACT

Quick connect arrangements for securing together first and second tubular members. A securing sleeve helps secure the connection together and include locking arrangements which ensure that the securing sleeve cannot be inadvertently unthreaded.

11 Claims, 8 Drawing Sheets

(56) References Cited

U.S. PATENT DOCUMENTS

| | | |
|---|---|---|
| 5,085,472 A | 2/1992 | Guest |
| 5,197,546 A | 3/1993 | Murray |
| 5,482,331 A | 1/1996 | Shore |
| 5,743,333 A | 4/1998 | Willauer et al. |
| 5,788,290 A | 4/1998 | Meisinger |
| 5,775,742 A | 7/1998 | Guest |
| 5,918,913 A | 7/1999 | Lewis et al. |
| 5,984,029 A | 11/1999 | Griffin et al. |
| 6,371,531 B1 | 4/2002 | Robison |
| 6,457,749 B1 | 10/2002 | Heijnen |
| 6,641,177 B1 | 11/2003 | Pinciaro |
| 6,824,170 B2 | 11/2004 | Lee |
| 7,552,766 B2 | 6/2009 | Gazewood |
| 7,793,993 B2 | 9/2010 | Kees et al. |
| 8,490,692 B2 | 7/2013 | Stautzenberger et al. |
| 8,505,638 B2 | 8/2013 | Ezell et al. |
| 2004/0207202 A1* | 10/2004 | Parks .................... F16L 37/105 285/391 |
| 2008/0100062 A1 | 5/2008 | Aston |

* cited by examiner

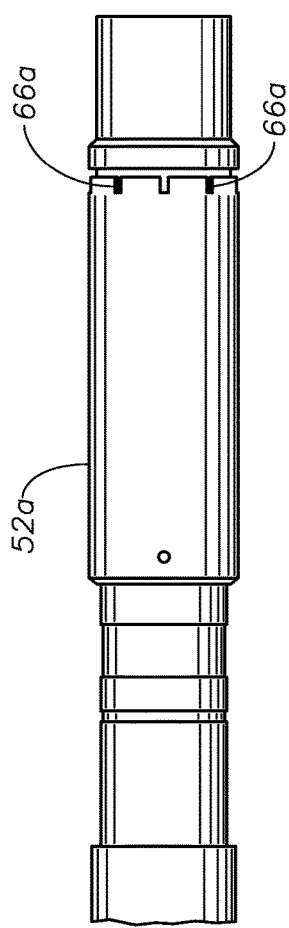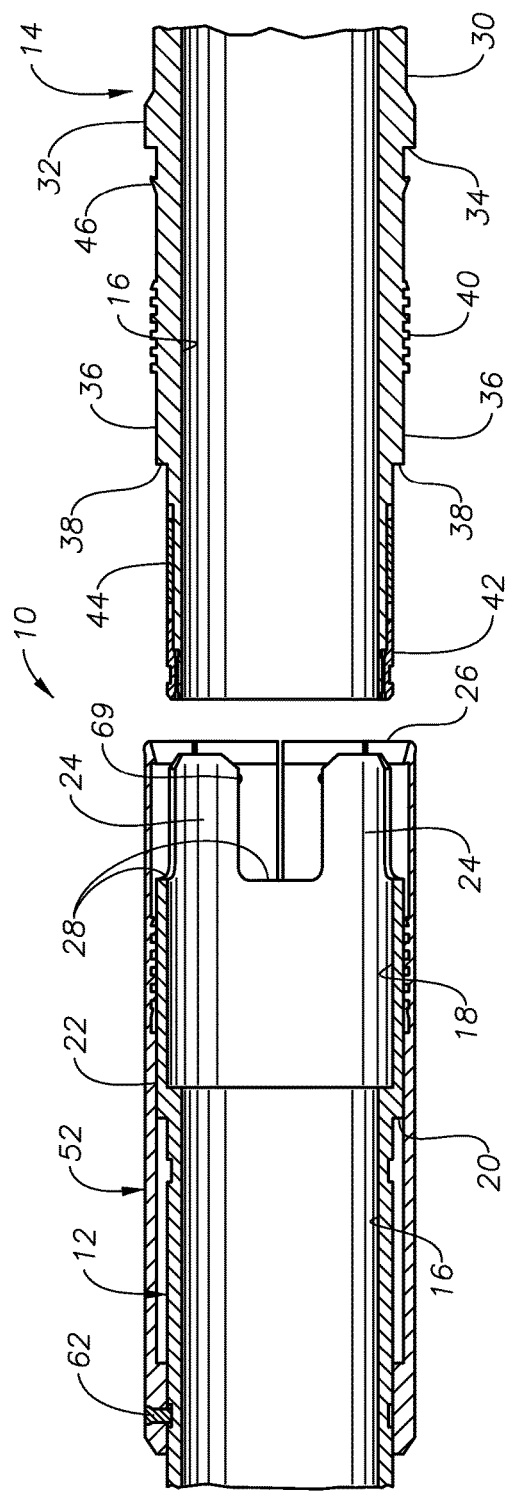

QUICK CONNECTION ARRANGEMENTS WITH LOCKING MECHANISMS

BACKGROUND OF THE INVENTION

1. Field of the Invention

The invention relates generally to devices and methods for rapidly interconnecting tubular members.

2. Description of the Related Art

In steerable drilling liner systems, the steerable liner is subject to high drag and torque. Tubular members should be connected prior to running in or during portions of the run-in operation in a manner that resists inadvertent uncoupling during operation.

SUMMARY OF THE INVENTION

The invention provides quick connect arrangements that allow two tubular members to be rapidly connected together and be secured against axial and rotational movement with respect to one another. According to particular aspects, the quick connect arrangements are designed to maintain internal pressure within the tubular members when interconnected. The devices and methods of the present invention are particularly useful for interconnecting sections of drilling liners used in steerable drilling operations. The quick connect arrangements of the present invention include securing sleeves that help secure the first and second tubular members together. Once the quick connect arrangements are made up, the securing sleeves are prevented from unthreading by locking mechanisms.

A first quick connection arrangement is described wherein locking mechanism is an axial locking mechanism. The securing sleeve is locked against axial movement and rotation with respect to the first and second tubular members by interlocking of an anchor latch formed on the second tubular member and barbed collet heads formed on the securing sleeve. In preferred embodiments, the anchor latch presents a negative rake angle that can be securely engaged by the barb.

An alternate quick connection arrangement is described wherein the locking mechanism is a rotational locking mechanism. The securing sleeve is locked against rotation and axial movement with respect to the first and second tubular member by a ratchet-style anti-rotation lock. In a described embodiment, one or more radially-tapered anti-rotation tabs that are formed on the outer radial surface of the second tubular member. The securing sleeve has axially-extending collet fingers that have complementary anti-rotation tabs. Unthreading of the securing sleeve is prevented by the engagement between anti-rotation tabs on the securing sleeve and those on the second tubular member.

A release mechanism is described for each of the quick connection arrangements which allows the securing sleeve to be released from a locked configuration with the second tubular member. One or more threaded members, such as screws, are threaded into threaded openings in the collet fingers of the securing sleeve and are tightened against the outer radial surface of the second tubular member. This causes the collet to be backed away from the second tubular member and release the barb or anti-rotation tab from engagement, thereby allowing the securing sleeve to be unthreaded.

BRIEF DESCRIPTION OF THE DRAWINGS

The advantages and further aspects of the invention will be readily appreciated by those of ordinary skill in the art as the same becomes better understood by reference to the following detailed description when considered in conjunction with the accompanying drawings in which like reference characters designate like or similar elements throughout the several figures of the drawing and wherein:

FIG. 1A is an isometric view of an alternative quick connect arrangement having shortened axial slots in the securing sleeve.

FIG. 2 is a side, cross-sectional view of the quick connect arrangement depicted in FIG. 1.

DETAILED DESCRIPTION OF THE PREFERRED EMBODIMENTS

Figure 1:
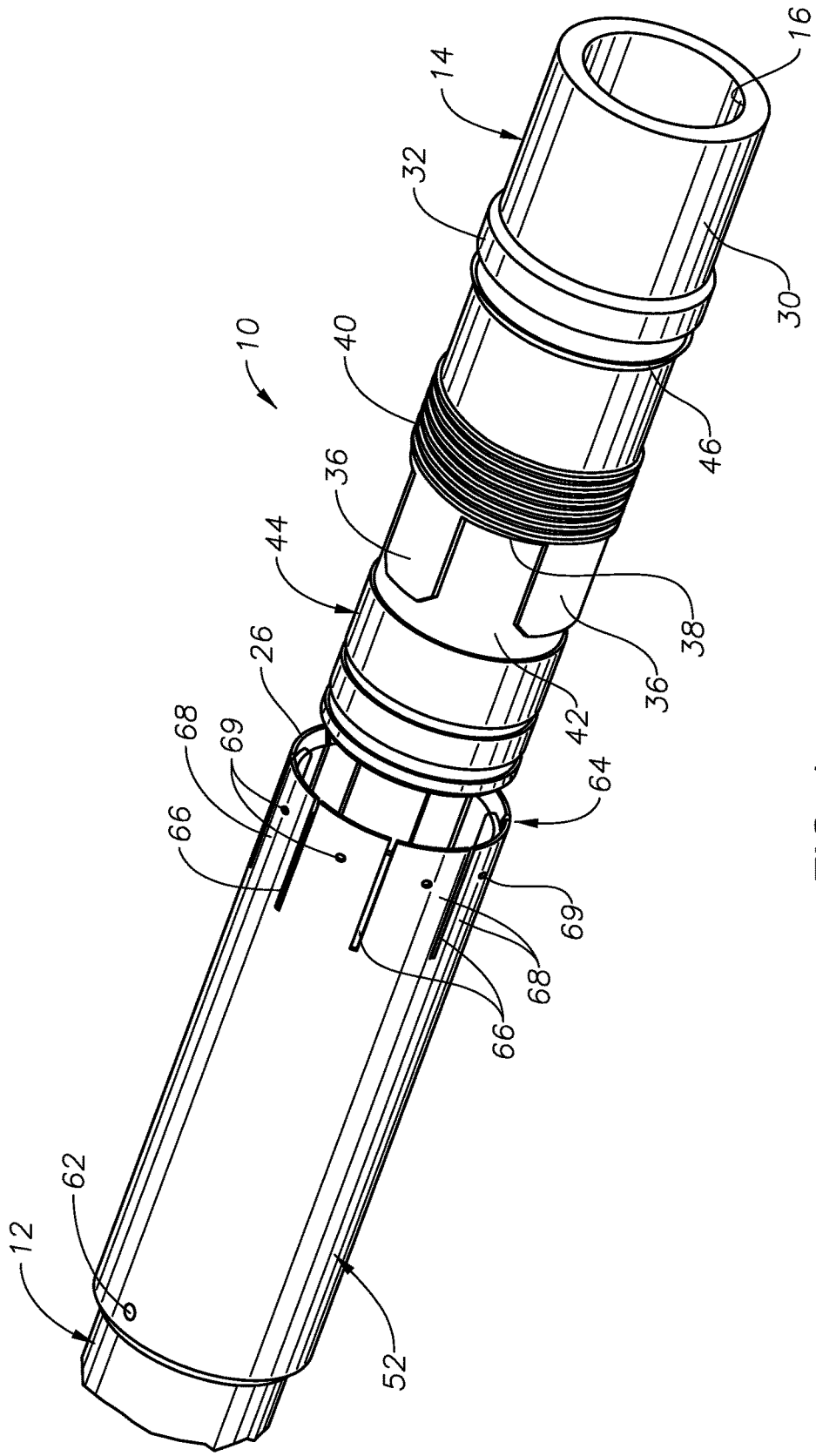
FIG. 1 is an isometric view of an exemplary quick connect arrangement in accordance with the present invention.

FIGS. 1-5 and 5A illustrate an exemplary quick connect arrangement 10 in which a first tubular member 12 and a second tubular member 14 are reversibly secured to each other in an end to end fashion. Each of the tubular members 12, 14 define a central axial bore 16 along its length.

The first tubular member 12 includes an enlarged diameter chamber portion 18. A stop shoulder 20 is formed on the outer radial diameter surface 22 of the first tubular member 12. Axially projecting fingers 24 are formed at the axial end 26 of the first tubular member 12. A recess 28 is formed between each pair of fingers 24.

The second tubular member 14 presents an outer radial surface 30 having a raised ring 32 which presents an axially-facing stop shoulder 34. Radially raised fingers 36 are formed upon the outer radial surface 30. Radially reduced recesses 38 are formed in between each pair of fingers 36. Preferably, the fingers 36 and recesses 38 are formed by machining the outer radial surface 30.

Threads 40 are formed on the outer radial surface 30 of the second tubular member 14. In a currently preferred embodiment, the threads 40 are located axially between the raised ring 32 and the fingers 36.

The axial end of the second tubular member 14 has a portion with a radially-reduced diameter outer radial surface 42. This radially reduced portion 42 is shaped and sized to reside within the enlarged diameter chamber portion 18 of the first tubular member 12. Preferably, metallic or elastomeric fluid seals 44 radially surround the radially reduced diameter portion 42. When the radially reduced diameter portion 42 is inserted into the enlarged diameter chamber portion 18 of the first tubular member 12, the fluid seals 44 seal against the enlarged diameter chamber portion 18 to ensure that fluid pressure is retained within the axial bore 16.

An annular anchor latch 46 projects radially outwardly from the outer radial surface 30 of the second tubular member 14. Details of an exemplary anchor latch 46 are better appreciated with reference to FIG. 3. The anchor latch 46 presents an angled ramp surface 48 and a locking surface 50. In preferred embodiments, the locking surface 50 of the anchor latch 46 presents a negative rake angle. A negative rake angle is defined herein to mean an acute angle. It is preferred that the plane of the locking surface 50 be oriented to form acute angle with the outer radial surface 30.

Cylindrical securing sleeve 52 radially surrounds the first tubular member 11. Many features of the securing sleeve 52 are best appreciated with additional reference to FIG. 4. The sleeve 52 includes a solid sleeve portion 54 that defines a central interior axial passage 56. The passage 56 presents a reduced diameter interior end portion 58. A stop shoulder 60 is formed between the passage 56 and the reduced diameter interior end portion 58. The stop shoulder 60 is shaped and sized to abut the stop shoulder 20 on the first tubular member 12. Anti-rotation locking screws 62, of a type known in the art, may be disposed through the reduced diameter interior end portion 58.

Figure 3:
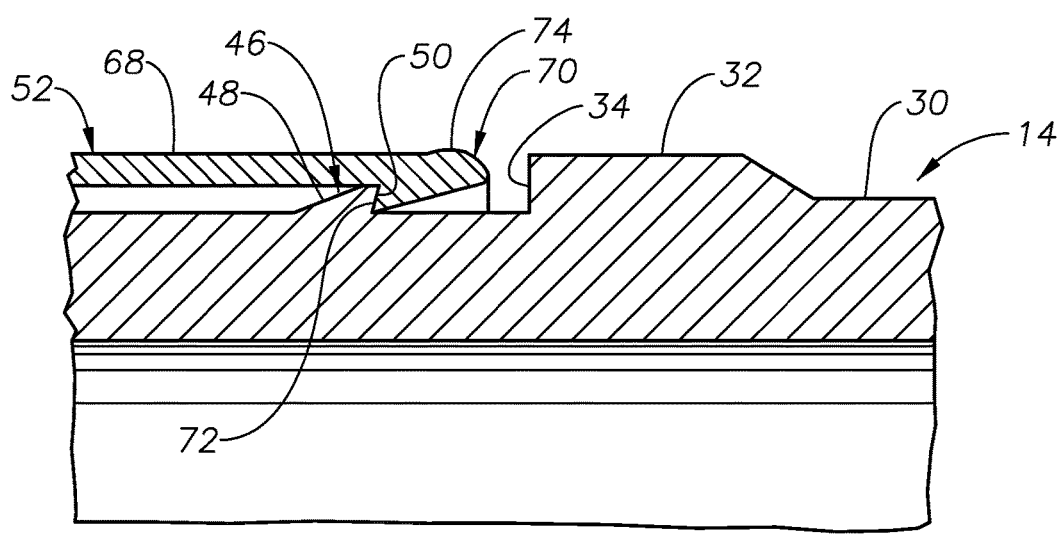
FIG. 3 is an enlarged side, cross-sectional view of an exemplary anchor latch and collet associated with the quick connect arrangement shown in FIGS. 1-2.

The distal axial end 64 of the securing sleeve 52 includes a number of axial slots 66 which define a plurality of collets 68. FIG. 1A depicts an alternative securing sleeve 52a wherein the axial slots 66a are significantly shorter than the slots 66. The axial ends of each collet 68, as best seen in FIG. 3, has a collet head 70 which, cross-sectionally, features a radially inwardly projecting barb 72 which is shaped and sized to engage the anchor latch 46 of the second tubular member 14. Dividing the securing sleeve 52 into collets 68, permits the collet heads 70 to flex radially outwardly to slide over and engage the anchor latch 46. In particular, the surfaces of the barb 72 are shaped and sized to engage the negative rake angle of the anchor latch 46. The collet head 70 also has a radially outwardly-projecting rounded bump 74 to help prevent the collet head 70 from catching on wellbore debris. Interior threading 76 is formed within the passage 56 and is complementary to the threads 40 on the outer radial surface 30 of the second tubular member 14.

Figure 4:
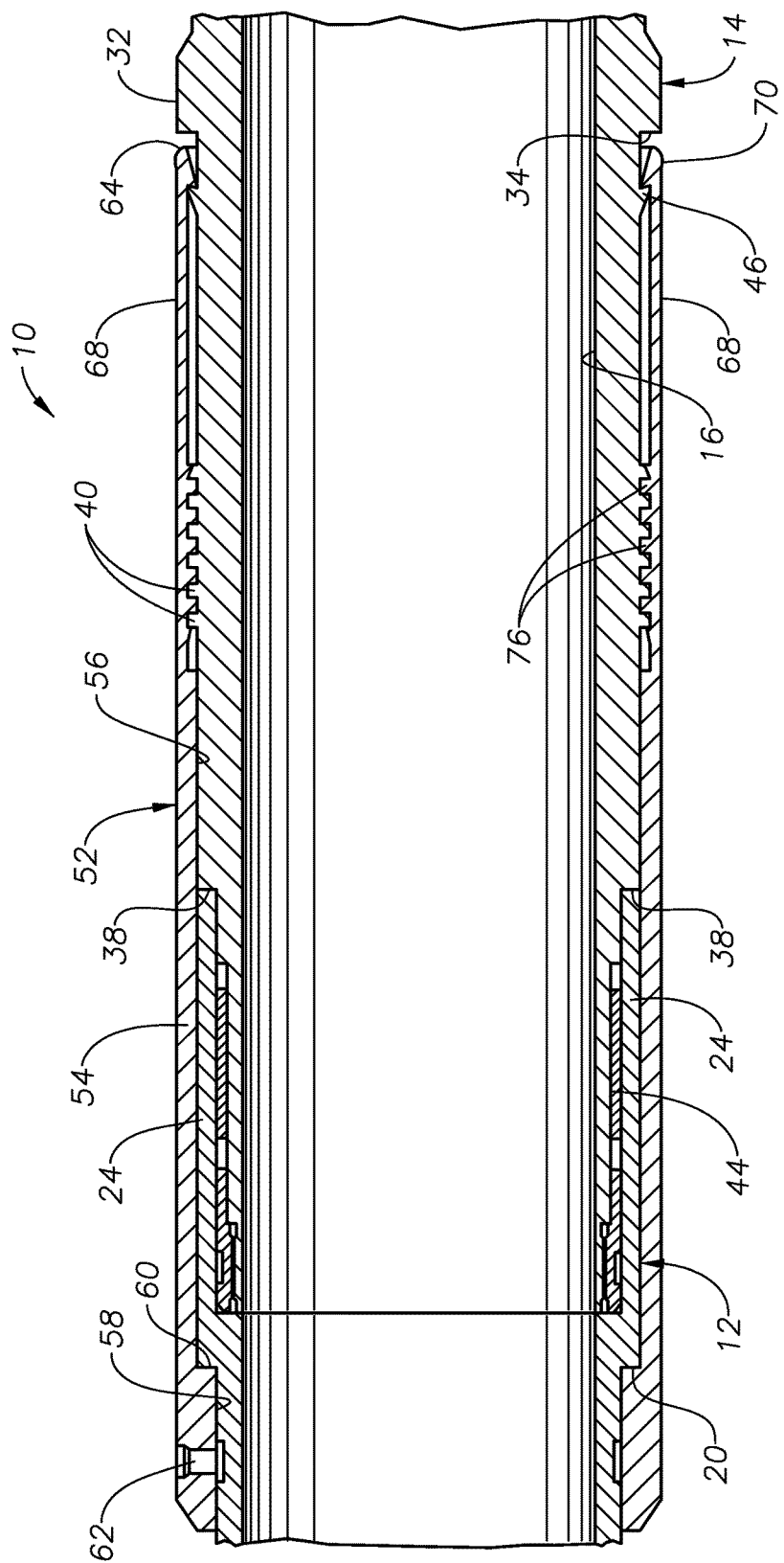
FIG. 4 is a side, cross-sectional view of the quick connect arrangement shown in FIGS. 1-2, now with the first and second tubular members having been interconnected.
Figure 5:
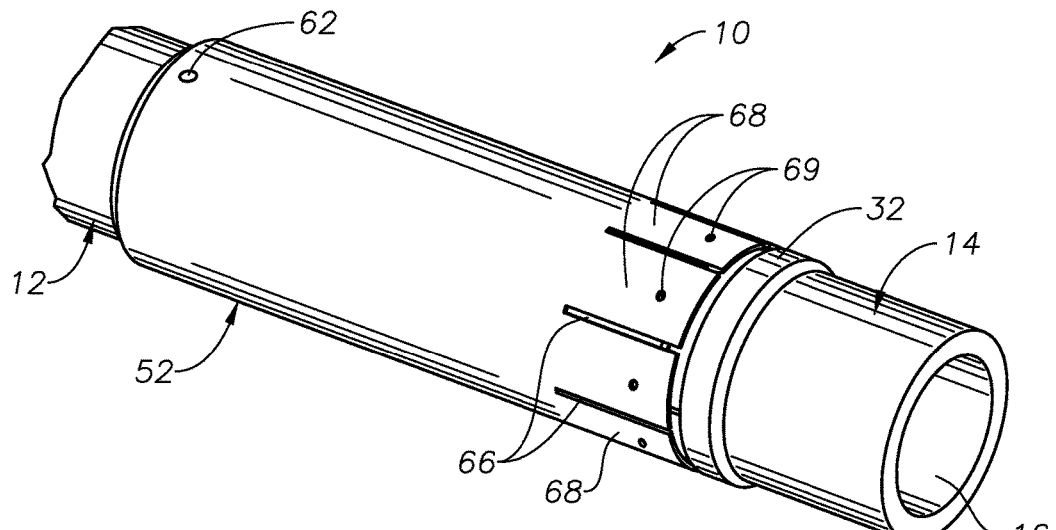
FIG. 5 is an external isometric drawing of the interconnected quick connect arrangement shown in FIG. 4.
Figure 5A:
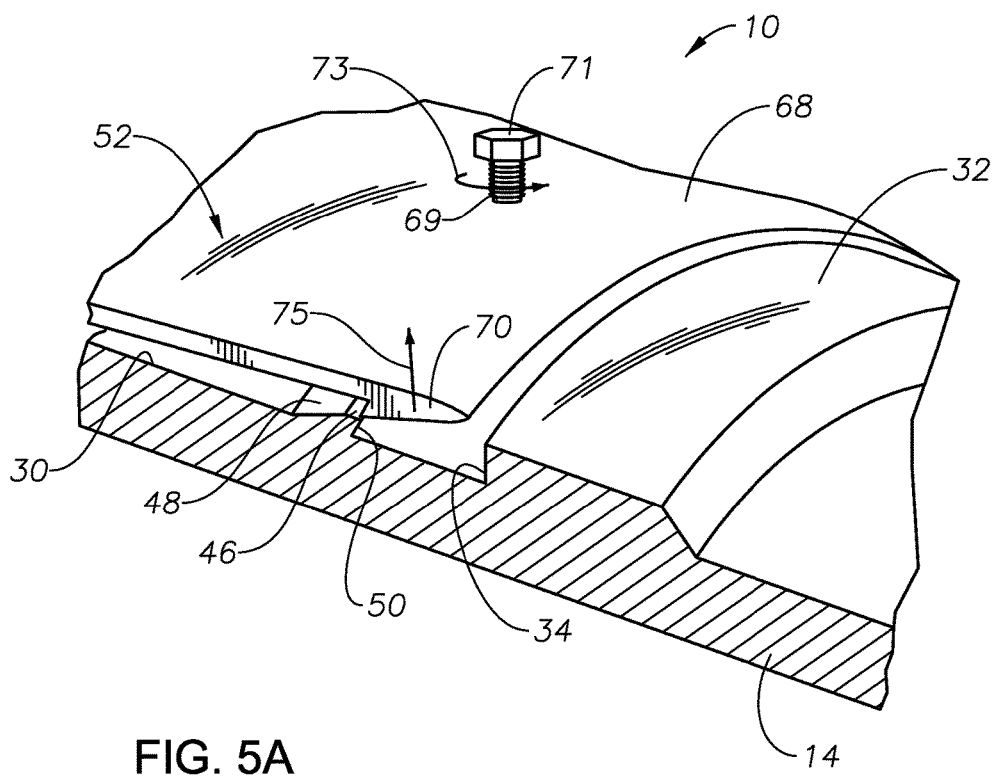
FIG. 5A is a sketch illustrating release of the securing sleeve.

In operation to quickly interconnect the first and second tubular members 12, 14, the radially-reduced diameter outer radial surface portion 42 of the second tubular member 14 is disposed into the enlarged diameter chamber portion 18 of the first tubular member 12, as shown in FIGS. 4 and 5. When this occurs, the fingers 24 of the first tubular member 12 are inserted into the recesses 38 of the second tubular member 14, and the fingers 36 of the second tubular member 14 are inserted into the recesses 28 of first tubular member 12. The securing sleeve 52 is then rotated so that the threads 40 of the second tubular member engage and are threaded into the threads 76 of the securing sleeve 52. As the threaded engagement is tightened, the collet heads 70 are moved axially over the anchor latch 46 until the barb 72 of the collet head 70 engages the anchor latch 46. The quick connect arrangement 10 will be locked against unthreading by this engagement. If desired, anti-rotation screws 62 can then be tightened to help prevent rotation of the securing sleeve 52 upon the first and second tubular members 12, 14.

It is noted that the securing sleeve 52 may be threaded onto the second tubular member 14 until the axial end 26 contacts the stop shoulder 34 on the second tubular member 14 or the shoulder 60 of the securing sleeve 52 contacts the shoulder 20 of the first tubular member 12.

FIGS. 4-5 illustrate the quick connect arrangement 10 having been made up. As can be seen, the anchor latch 46 and collet heads 70 provide an axial locking mechanism that locks the securing sleeve 52 against axial and/or radial movement with respect to the first and second tubular members 12, 14. This locking engagement helps ensure that the securing sleeve 52 will not inadvertently unthread during operation. It is noted that fluid pressure is maintained within the flowbore 16 due to the interlocking of fingers 24, 36 of the quick connect arrangement 10.

In particular embodiments, a mechanism is provided which allows for release of the securing sleeve 52 from locking engagement with the second tubular member 14. As can be seen in FIGS. 1, 2 and 5, threaded openings 69 are disposed through the collets 68 of the securing sleeve 52. If it is desired to disconnect the first tubular member 12 from the second tubular member 14, the securing sleeve 52 must be unthreaded from the second tubular member 14. To do this, screws or threaded members 71 (see FIG. 5A) are threaded into the holes 69 until they are brought into contact with the second tubular member 14. Further rotation of the screws in the direction of arrow 73 in FIG. 5A will then cause the collets 68 to be backed away radially outwardly, as illustrated by arrow 75 in FIG. 5A, from the outer radial surface 30 of the second tubular member 14 and disengage the securing sleeve 52 from locking engagement with the second tubular member 14. The securing sleeve 52 can then be unthreaded from the second tubular member 14.

Figure 6:
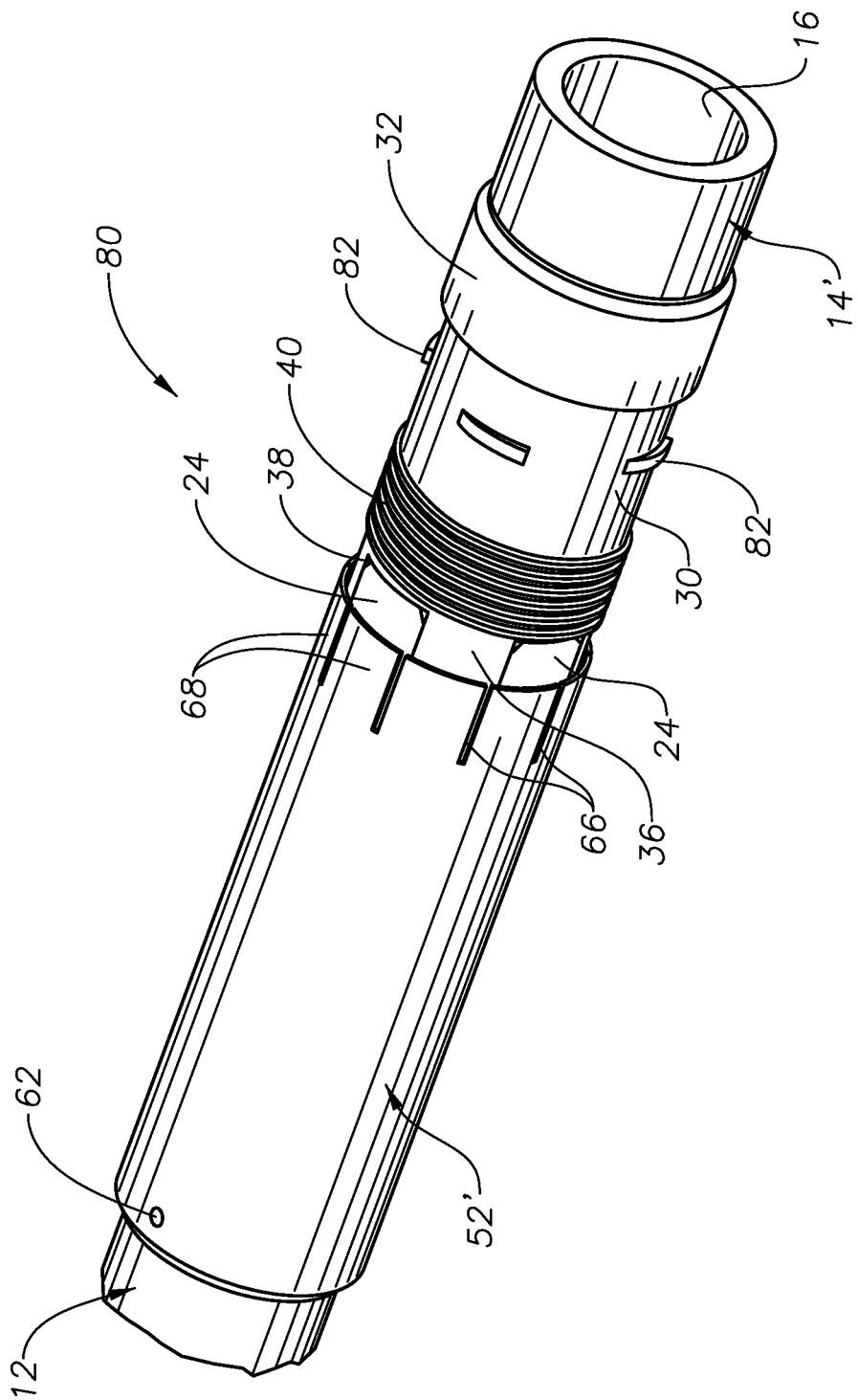
FIG. 6 is an external isometric view of an exemplary alternate quick connect arrangement in a partially assembled condition.
Figure 7:
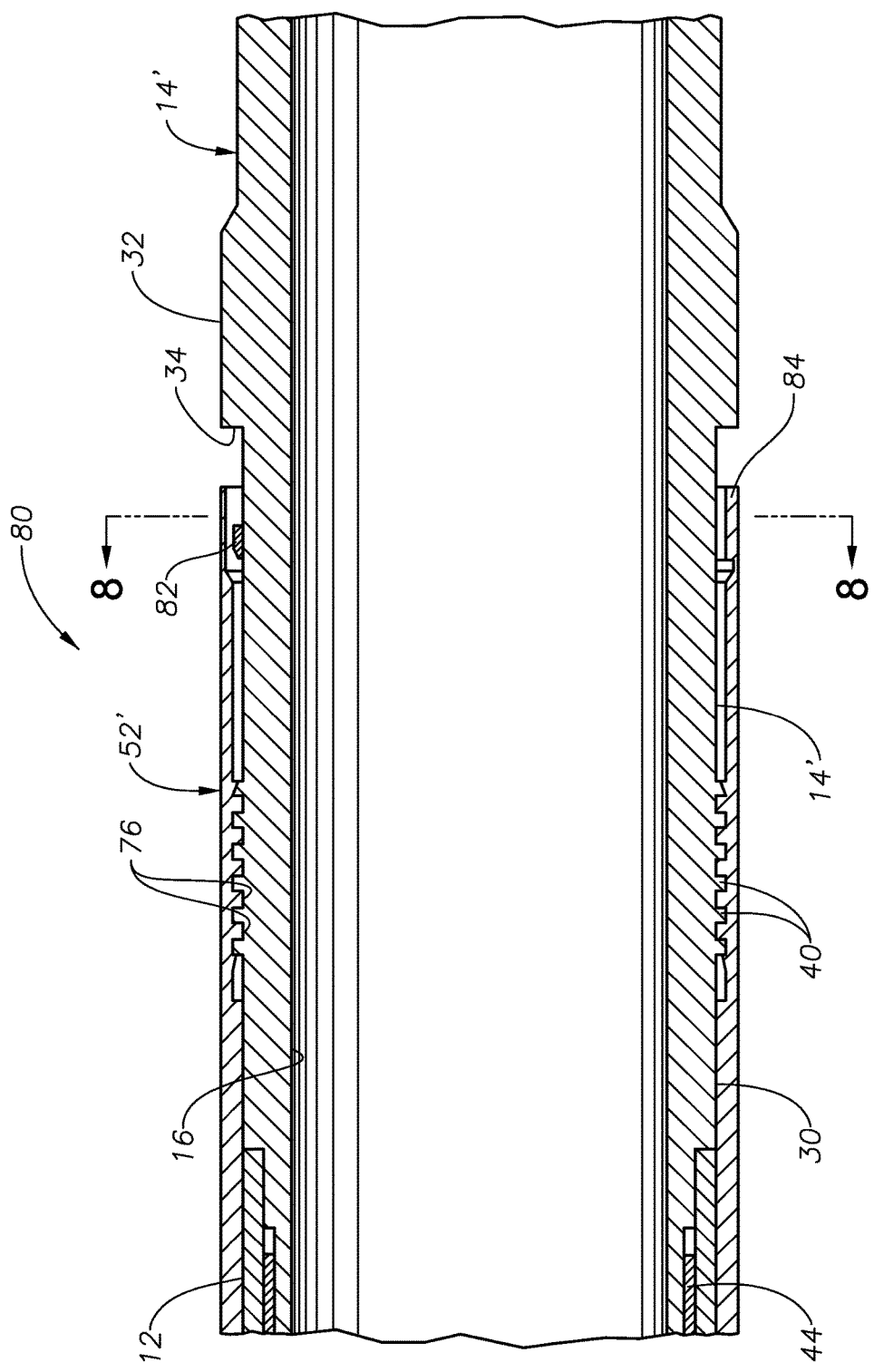
FIG. 7 is an enlarged side, cross-sectional view of portions of the quick connect arrangement shown in FIG. 6, now with the securing sleeve having been threaded onto the second tubular member.
Figure 8:
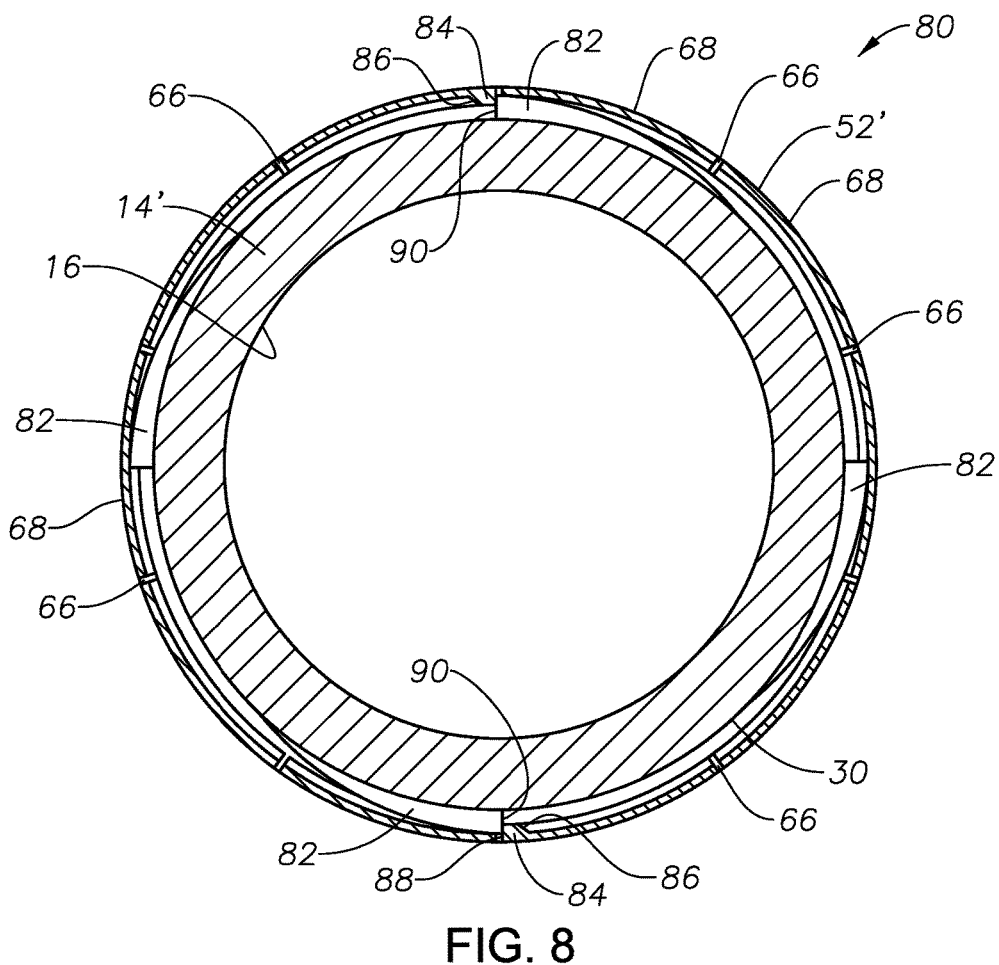
FIG. 8 is an axial cutaway view of portions of the quick connect arrangement taken along lines 8-8 in FIG. 7.

FIGS. 6-8 illustrate and alternative quick connect arrangement 80 which is being used to interconnect first and second tubular members 12, 14'. Where not otherwise specified, the quick connect arrangement 80 is constructed and operates in the same manner as the quick connect arrangement 10 described earlier. In this embodiment, the annular anchor latch 46 may not be present on the second tubular member 14'. In addition, the securing sleeve 52' may not be provided with collet heads 70 described previously.

The quick connect arrangement 80 features a ratchet-style anti-rotation locking mechanism. In the exemplary locking mechanism depicts in FIGS. 6-8, the second tubular member 14' presents an outer radial surface 30 upon which are formed anti-rotation, radially-outwardly extending locking tabs 82. In the depicted embodiment, there are four locking tabs 82 which are spaced about the circumference of the outer surface 30, as best seen in FIG. 8.

Figure 9:
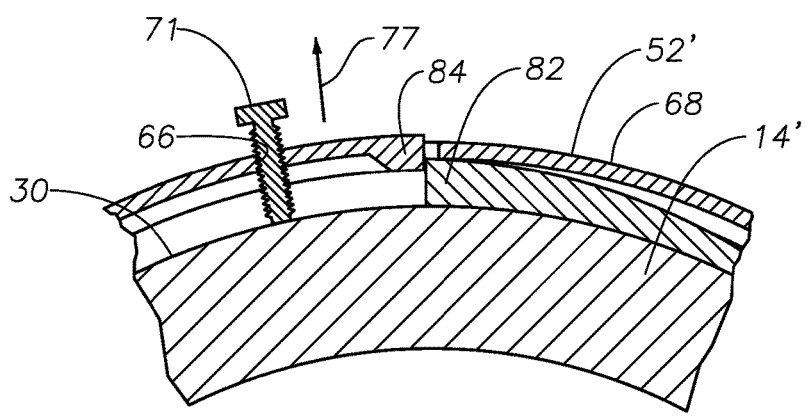
FIG. 9 is an enlarged axial cutaway of portions of the quick connect arrangement shown in FIGS. 6-8 illustrating release of the securing sleeve.

The securing sleeve 52' includes radially interiorly-directed anti-rotation tabs 84 that are formed upon the interior radial surface of each collet 68. In the depicted embodiment, there are two tabs 84, which are positioned at about 180 degrees from each other about the internal circumference of the securing sleeve 52'. It should be understood, however, that there may be more or fewer than two tabs 84. Each of the tabs 84 is preferably provided with a ramped surface 86 (see FIG. 8) which allows the tab 84 to slide over a complementary locking tab 82 until the engagement face 88 (FIG. 8) of the anti-rotation tab 84 is brought into abutting relation with the engagement face 90 of the locking tab 82. Collets 68 deflect radially outwardly to allow the anti-rotation tabs 84 to lock onto the locking tabs 82 in this manner. The presence of the ramped surface 86 permits this locking to occur as the securing sleeve 52' is threaded onto the second tubular member 14'. Locking of the securing sleeve 52' will occur in the manner of a ratchet wherein further rotation of the sleeve 52' will permit tighter locking. It is further noted that the securing sleeve 52' might be released from its locked condition with the use of screws (similar to screw 71 described earlier) employed to back the collets 68 away from the outer radial surface 30. FIG. 9 illustrates use of a screw 71 in this manner to release the securing sleeve 52' by backing the collet 68 away from the outer radial surface 30 as illustrated by arrow 77.

It can be seen that the present invention provides quick connect arrangements 10, 80 that can interconnect first and second tubular members and which include a securing sleeve 52, 52' that helps secure the connection together. In described embodiments, the quick connect arrangements include locking arrangements which ensure that the securing sleeve 52, 52' cannot be inadvertently unthreaded. In one described embodiment, the locking arrangement is an axial locking arrangement which prevents the securing sleeve 52 from axial movement with respect to the tubular members 12, 14. In a second described embodiment, the locking arrangement is a radial locking arrangement which prevents the securing sleeve 52' from radial movement upon the tubular members 12, 14'.

The foregoing, description is directed to particular embodiments of the present invention for the purpose of illustration and explanation. It will be apparent, however, to one skilled in the art that many modifications and changes to the embodiment set forth above are possible without departing from the scope and the spirit of the invention.

What is claimed is:

1. A quick connect arrangement for securing together tubular members, the arrangement comprising:
   a first tubular member having an axial end with a plurality of axially extending fingers formed thereon with a recess disposed between adjacent fingers;
   a second tubular member having a plurality of recesses for receiving each of said fingers when the first axial end is connected with the second tubular member;
   a securing sleeve that radially surrounds the first and second tubular members and is threaded onto the second tubular member to secure the first and second tubular members together;
   the securing sleeve being secured against removal from the first tubular member from the axial end when the first and second tubular members are unaffixed to each other by abutment of stop shoulders located upon the securing sleeve and the first tubular member;
   a locking mechanism to lock the securing sleeve against unthreading from the second tubular member; and
   wherein the locking mechanism comprises an anchor latch formed on the second tubular member and a barb formed on the securing sleeve, the barb being shaped and sized to engage the anchor latch and thereby lock the securing sleeve against axial movement with respect to the first and second tubular members.

2. The quick connect arrangement of claim 1 wherein the securing sleeve comprises:
   a cylindrical sleeve body;
   a plurality of slots formed within an axial end of the sleeve body to form collets.

3. The quick connect arrangement of claim 2 further comprising a locking release mechanism for releasing the securing sleeve from a locked configuration with the second tubular member, the locking release mechanism comprises:
   a threaded opening disposed through at least one of the collets; and
   a threaded member that is insertable into the threaded opening and tightened against the second tubular member to cause the collet to back away from the second tubular member so that the securing sleeve is released from the locked configuration.

4. The quick connect arrangement of claim 1 wherein the barb is formed on a collet portion of the securing sleeve.

5. The quick connect arrangement of claim 1 wherein the anchor latch presents an engagement surface having a negative rake angle.

6. A quick connect arrangement for securing together tubular members, the arrangement comprising:
   a first tubular member having an axial end with a plurality of axially extending fingers formed thereon with a recess disposed between adjacent fingers;
   a second tubular member having a plurality of recesses for receiving each of said fingers when the first axial end is connected with the second tubular member;
   a fluid seal radially surrounding the second tubular member to seal against an interior bore of the first tubular member when the quick connect arrangement is assembled to retain fluid pressure within the interior bore;
   a securing sleeve that radially surrounds the first and second tubular members and is threaded onto the second tubular member to secure the first and second tubular members together, the securing sleeve having a sleeve body and plurality of slots formed within an axial end of the sleeve body to form collets;
   the securing sleeve being secured against removal from the first tubular member from the axial end when the first and second tubular members are unaffixed to each other by abutment of stop shoulders located upon the securing sleeve and the first tubular member; and
   a locking mechanism to lock the securing sleeve against unthreading from the second tubular member.

7. The quick connect arrangement of claim 6 wherein the locking arrangement comprises:
   an anchor latch formed on the second tubular member; and
   a barb formed on the securing sleeve, the barb being shaped and sized to engage the anchor latch and thereby lock the securing sleeve against axial movement with respect to the first and second tubular members.

8. The quick connect arrangement of claim 7 wherein the barb is formed on the collet of the securing sleeve.

9. The quick connect arrangement of claim 7 wherein the anchor latch presents an engagement surface having a negative rake angle.

10. The quick connect arrangement of claim 6 further comprising a locking release mechanism for releasing the securing sleeve from a locked configuration with the second tubular member, the locking release mechanism comprises:
    a threaded opening disposed through at least one of the collets; and
    a threaded member that is insertable into the threaded opening and tightened against the second tubular member to cause the collet to back away from the second tubular member so that the securing sleeve is released from the locked configuration.

11. A method of securing first and second tubular members together using a quick connect assembly, the method comprising the steps of:
    providing a first tubular member having an axial end with a plurality of axially extending fingers formed thereupon with a recess disposed between adjacent fingers;
    securing a securing sleeve against removal from the first tubular member from the axial end when the first tubular member is unaffixed to a second tubular member by abutment of stop shoulders located upon the securing sleeve and the first tubular member;

adjoining the axial end of the first tubular member to an end of the second tubular member such that each of the fingers of the first tubular member is received within a recess formed within the second tubular member;

threading the securing sleeve that radially surrounds the first and second tubular members onto the second tubular member to secure the first and second tubular members together;

stopping the securing sleeve being threaded onto the second tubular member by abutment of stop shoulders located on the securing sleeve and the first tubular member; and locking the securing sleeve against unthreading from the second tubular member by engaging an anchor latch formed on the second tubular member with a barb formed on the securing sleeve, the barb being shaped and sized to engage the anchor latch to thereby lock the securing sleeve against axial movement with respect to the first and second tubular members.

\* \* \* \* \*

UNITED STATES PATENT AND TRADEMARK OFFICE
CERTIFICATE OF CORRECTION

PATENT NO. : 9,816,329 B2
APPLICATION NO. : 14/458113
DATED : November 14, 2017
INVENTOR(S) : Varghese et al.

It is certified that error appears in the above-identified patent and that said Letters Patent is hereby corrected as shown below:

On the Title Page

Item (73), the Assignee section, the word "HUGES" should read -- HUGHES --.

Signed and Sealed this
Nineteenth Day of December, 2017

Joseph Matal
*Performing the Functions and Duties of the*
*Under Secretary of Commerce for Intellectual Property and*
*Director of the United States Patent and Trademark Office*